(12) United States Patent
Li et al.

(10) Patent No.: US 11,486,521 B2
(45) Date of Patent: Nov. 1, 2022

(54) FLUID PIPELINE CONNECTION DEVICE, FLUID PIPELINE CONNECTION ASSEMBLY, AND FLUID PIPELINE CONNECTION MECHANISM

(71) Applicant: Wiwynn Corporation, New Taipei (TW)

(72) Inventors: Shang-Chien Li, New Taipei (TW); Yung-Ti Chung, New Taipei (TW)

(73) Assignee: WIWYNN CORPORATION, New Taipei (TW)

( * ) Notice: Subject to any disclaimer, the term of this patent is extended or adjusted under 35 U.S.C. 154(b) by 170 days.

(21) Appl. No.: 17/164,900

(22) Filed: Feb. 2, 2021

(65) Prior Publication Data

US 2022/0136628 A1     May 5, 2022

(30) Foreign Application Priority Data

Nov. 4, 2020  (TW) .................................. 109138494

(51) Int. Cl.
| | | |
|---|---|---|
| *F16L 27/10* | (2006.01) | |
| *F16L 19/02* | (2006.01) | |
| *F16L 21/08* | (2006.01) | |

(52) U.S. Cl.
CPC ........... *F16L 19/0212* (2013.01); *F16L 21/08* (2013.01)

(58) Field of Classification Search
CPC ....... F16L 19/0212; F16L 21/08; F16L 55/02; F16L 37/04; F16L 27/00; F16L 27/103; F16L 27/02; F16L 27/10; F16L 27/113; F16L 27/1012; F16L 27/1017; F16L 27/1025; F16L 27/1021
USPC ............................................................. 285/19
See application file for complete search history.

(56) References Cited

U.S. PATENT DOCUMENTS

| | | | | |
|---|---|---|---|---|
| 5,090,746 | A * | 2/1992 | Holzhausen | ........ F16L 27/0857 285/364 |
| 5,358,287 | A * | 10/1994 | Winzen | ............... F01N 13/1811 285/227 |
| 2020/0099212 | A1 * | 3/2020 | Bell | ......................... H02G 3/32 |
| 2021/0381421 | A1 * | 12/2021 | Huang | ................ F16L 27/1021 |

\* cited by examiner

*Primary Examiner* — Aaron M Dunwoody
(74) *Attorney, Agent, or Firm* — McClure, Qualey & Rodack, LLP

(57) ABSTRACT

A fluid pipeline connection device includes a fixed base, a floating piece, a connecting tube, and a plurality of elastic bodies. The fixed base includes a first side surface and a second side surface opposite to each other. The floating piece abuts against the first side surface and the second side surface. The connecting tube passes through the first side surface and the second side surface of the fixed base, and the connecting tube is combined with the floating piece. The elastic bodies are disposed in the fixed base, and the elastic bodies are in contact with the connecting tube.

22 Claims, 18 Drawing Sheets

FLUID PIPELINE CONNECTION DEVICE, FLUID PIPELINE CONNECTION ASSEMBLY, AND FLUID PIPELINE CONNECTION MECHANISM

CROSS-REFERENCE TO RELATED APPLICATION

This non-provisional application claims priority under 35 U.S.C. § 119(a) to Patent Application No. 109138494 filed in Taiwan, R.O.C. on Nov. 4, 2020, the entire contents of which are hereby incorporated by reference.

BACKGROUND

Technical Field

This disclosure relates to connection of pipelines, and in particular, to a fluid pipeline connection device, a fluid pipeline connection assembly, and a fluid pipeline connection mechanism.

Related Art

In a water cooling solution of mainframe computers and the like, a water cooling module is externally connected to a cabinet, and the water cooling module is connected to a heat exchange device, such as a water cooled heat sink, in the cabinet through a pipeline, to cool a heat source in the cabinet.

The water cooling module is blindly jointed to the pipeline built in the cabinet through pipe joints. Male and female pipe joints are respectively provided to the water cooling module and the cabinet. The water cooling module is pushed toward the cabinet on a guide rail or a mounting frame, so that the male and female pipe joints are directly combined to complete the blind connection. Pressure of cooling fluids generate a thrust force at a connection between the male and female pipe joints, to separate the male and female pipe joints. Therefore, after the male and female pipe joints disposed on the water cooling module and the cabinet are connected, the water cooling module needs to be further fixed to the cabinet to resist the thrust force.

However, manufacturing tolerances respectively exist in the water cooling module and the cabinet in addition to assembly tolerances generated when the water cooling module is mounted on the cabinet, there is be a deviation between axes of the male and female pipe joints. Such a deviation causes a failure of the blind connection between the male and female pipe joints. Consequently, connection operation cannot be performed smoothly, or unreliable jointing causes a water leakage.

SUMMARY

Based on the foregoing problems, this disclosure provides a fluid pipeline connection device, a fluid pipeline connection assembly, and a fluid pipeline connection mechanism, so that blind connection can be performed in the presence of dimensional tolerances of components and manufacturing tolerances, to resolve the problem of docking pipeline connectors.

At least one embodiment of this disclosure provides a fluid pipeline connection device, including a fixed base, a floating piece, a connecting tube, and a plurality of elastic bodies. The floating piece abuts against the first side surface and the second side surface. The connecting tube passes through the first side surface and the second side surface of the fixed base, and the connecting tube is combined with the floating piece. The elastic bodies are disposed in the fixed base, and the elastic bodies are in contact with the connecting tube.

At least one embodiment of this disclosure provides a fluid pipeline connection assembly, including a bottom plate and the foregoing fluid pipeline connection device. The fluid pipeline connection device is fixed to the bottom plate, and the fluid pipeline connection device further includes a protection shell provided with a first opening and a second opening opposite to each other. The protection shell is configured to accommodate the fixed base, the floating piece, the connecting tube, and the elastic bodies, and the fixed base is fixed to the protection shell; a first pipeline connecting piece and a second pipeline connecting piece respectively correspond to the first opening and the second opening. The protection shell includes a seat and an upper cover, the upper cover is combined with the seat, and the first opening and the second opening are provided in the upper cover. The seat is provided with at least one second fixing through hole, the fixed base is provided with at least one positioning hole, and the second fixing through hole and the positioning hole overlap with each other; a positioning pin is disposed on the bottom plate, and the positioning pin is configured to pass through the second fixing through hole and the positioning hole.

At least one embodiment of this disclosure provides a fluid pipeline connection mechanism, including a bottom plate, the foregoing fluid pipeline connection device, and a pipeline bracket. The fluid pipeline connection device is fixed to the bottom plate. A receiving tube and at least one guiding column are disposed on the pipeline bracket, and the guiding column is parallel to the receiving tube. The fluid pipeline connection device further includes a guiding piece, the guiding piece is combined with the connecting tube, the guiding piece is provided with at least one tapered hole and at least one guiding hole, the tapered hole is provided in a surface of the guiding piece, and a bottom of the tapered hole is connected to the guiding hole. The guiding column is configured to be inserted into the guiding hole to drive the floating piece to move and align the connecting tube with the receiving tube.

In the fluid pipeline connection device of this disclosure, configuration of the floating pieces enables displacement of the connecting tube when connecting the connecting tube to a corresponding receiving tube. In the process of jointing the connecting tube with the receiving tube by matching the guiding piece and the guiding column, the guiding piece and the guiding column drives the connecting tube to align the connecting tube with the receiving tube.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
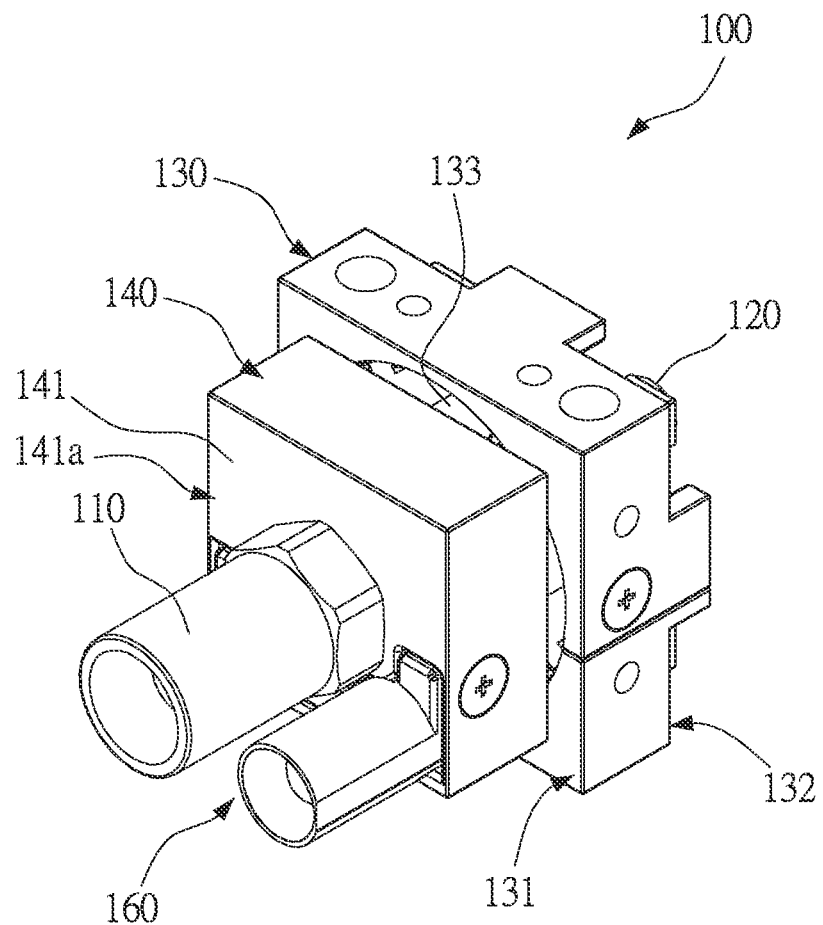
FIG. 1 is a three-dimensional diagram of a fluid pipeline connection device according to a first embodiment of this disclosure.
Figure 2:
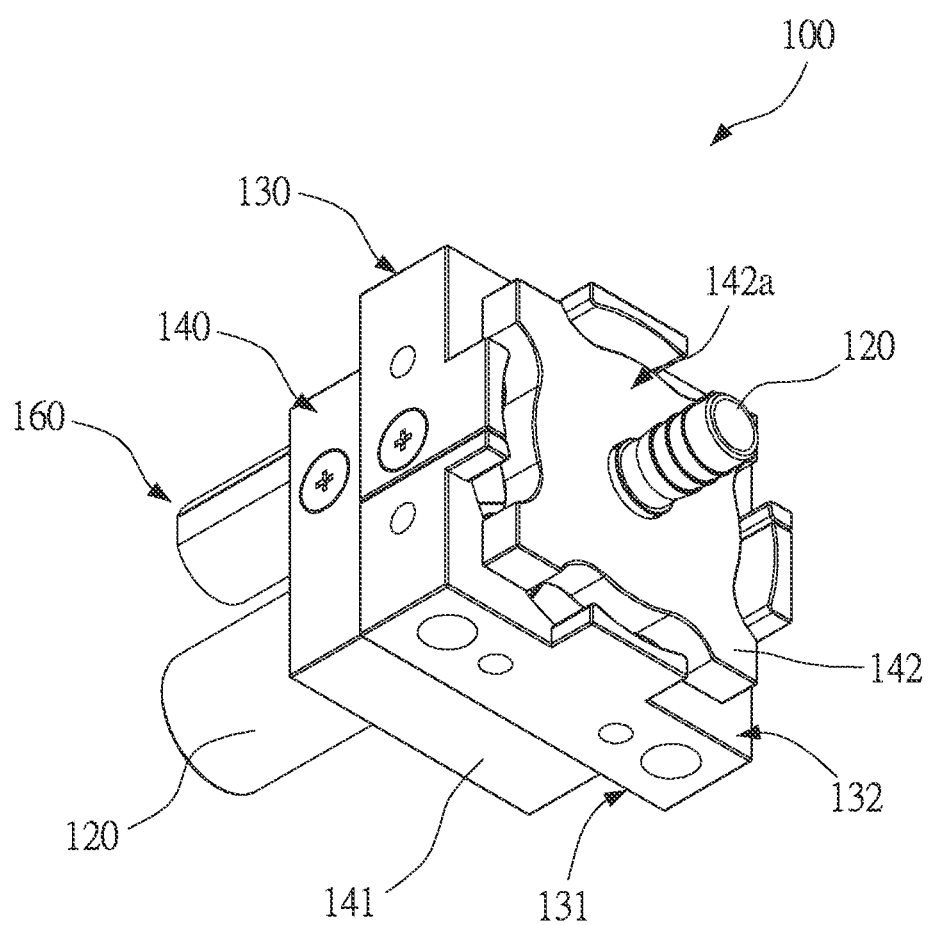
FIG. 2 is another three-dimensional diagram of the fluid pipeline connection device according to the first embodiment of this disclosure.
Figure 3:
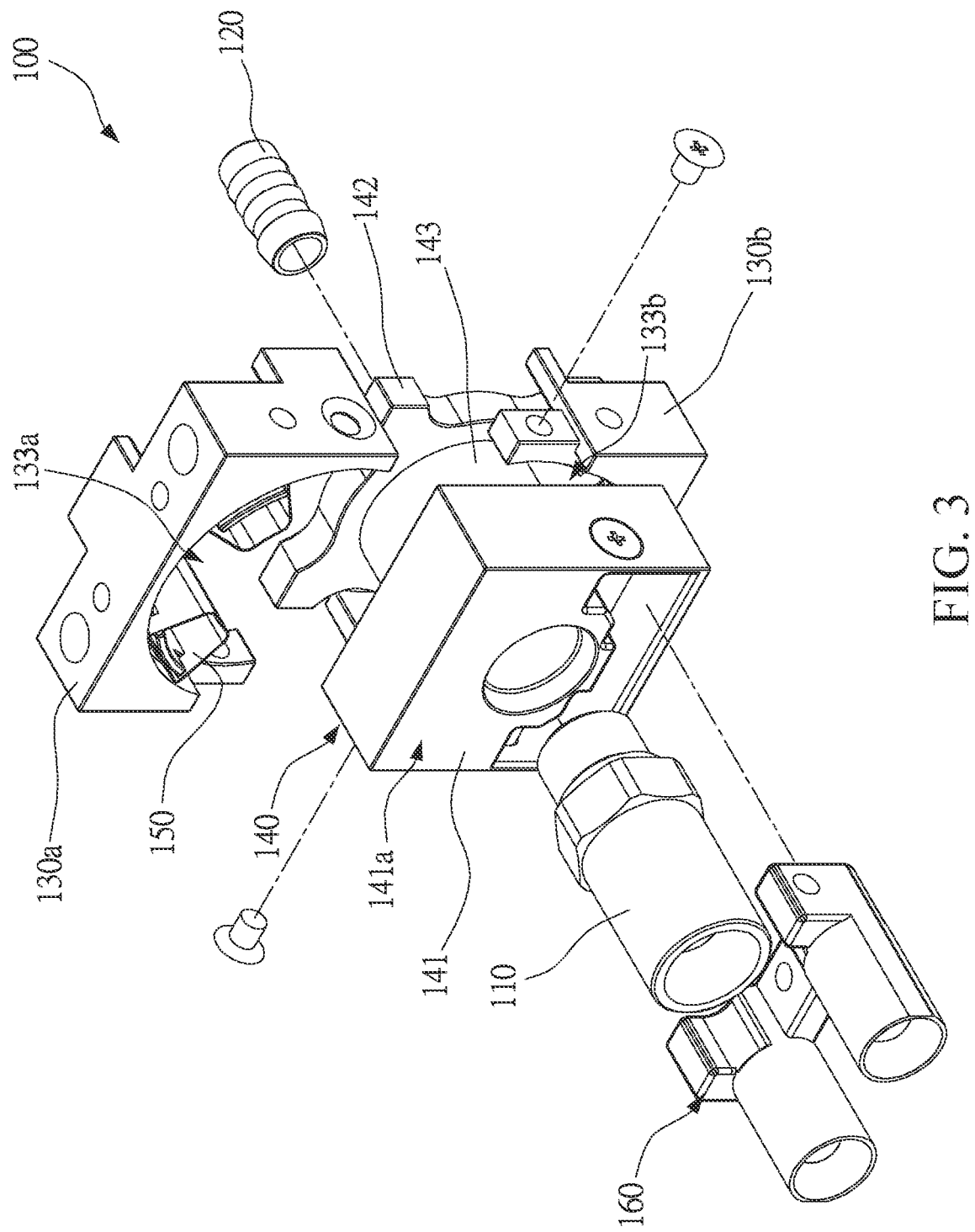
FIG. 3 is an exploded view of the fluid pipeline connection device according to the first embodiment of this disclosure.

FIG. 1, FIG. 2, and FIG. 3 show a fluid pipeline connection device 100 disclosed in a first embodiment of this disclosure. The fluid pipeline connection device 100 includes a fixed base 130, a floating piece 140, a connecting tube 143, a plurality of elastic bodies 150, a first pipeline connecting piece 110, and a second pipeline connecting piece 120. In one specific embodiment, the fixed base 130 and the floating piece 140 are metal casting or machining parts to provide sufficient rigidity. In one specific embodiment, the floating piece 140 and the connecting tube 143 are integrally formed. Alternatively, the floating piece 140 and the connecting tube 143 are components independent of each other.

As shown in FIG. 1 and FIG. 2, the fixed base 130 includes a first side surface 131 and a second side surface 132 opposite to each other, and the fixed base 130 is provided with an accommodating bore 133, passing through the first side surface 131 and the second side surface 132.

As shown in FIG. 1, FIG. 2, FIG. 3, and FIG. 4, the floating piece 140 abuts against the first side surface 131 and the second side surface 132. In one or more embodiments of this disclosure, the floating piece 140 includes a first flange 141 and a second flange 142. The first flange 141 and the second flange 142 respectively abut against the first side surface 131 and the second side surface 132 of the fixed base 130, and the connecting tube 143 is connected to the first flange 141 and the second flange 142.

As shown in FIG. 1, FIG. 2, FIG. 3, and FIG. 4, the connecting tube 143 is located in the accommodating bore 133, and passes through the first side surface 131 and the second side surface 132 of the fixed base 130. The connecting tube 143 is combined with the floating piece 140. Particularly, two ends of the connecting tube 143 are respectively connected to the first flange 141 and the second flange 142.

As shown in FIG. 1, FIG. 2, FIG. 3, and FIG. 4, the elastic bodies 150 are disposed in the fixed base 130, and are located in the accommodating bore 133. Specifically, the elastic bodies 150 are arranged in radial symmetry, and are separately in contact with the connecting tube 143, to keep the connecting tube 143 at a neutral position P1. A cross-sectional area of the connecting tube 143 is smaller than that of the accommodating bore 133, so that the connecting tube 143 is able to be displaced along a radial direction of the accommodating bore 133. Projection areas of the first flange 141 and the second flange 142 along an axial direction of the accommodating bore 133 are greater than the cross-sectional area of the accommodating bore 133, and a distance between the first flange 141 and the second flange 142 is equal to or slightly greater than thickness between the first side surface 131 and the second side surface 132, to limit the floating piece 140, so that the floating piece 140 and the connecting tube 143 are not separated from the fixed base 130. In addition, the fixed base 130 is located between the first flange 141 and the second flange 142, and only a narrow gap is reserved. Therefore, the connecting tube 143 in the accommodating bore 133 is limited to only move along the radial direction of the accommodating bore 133 without greatly deviating in an axial direction.

In a specific embodiment, the fixed base 130 is further cut into three or more cutting blocks. Each cutting block is provided with a notch. The notches are combined into the accommodating bore 133 through combination of the cutting blocks. The connecting tube 143 is surrounded by the cutting blocks through separation and combination of the cutting blocks, and passes through the fixed base 130.

As shown in FIG. 3, the fixed base 130 is alternatively cut into only two cutting blocks to form an upper base 130a and a lower base 130b. The upper base 130a and the lower base 130b may be separated from or combined with each other.

The upper base 130a and the lower base 130b are respectively provided with an upper notch 133a and a lower notch 133b corresponding to each other. The upper base 130a and the lower base 130b are inserted between the first flange 141 and the second flange 142 through two sides of the connecting tube 143, to combine the upper notch 133a and the lower notch 133b into the accommodating bore 133. A screw locking piece passes through the upper base 130a and the lower base 130b, so that the upper base 130a and the lower base 130b are fixed to each other to be combined into the fixed base 130.

Figure 4:
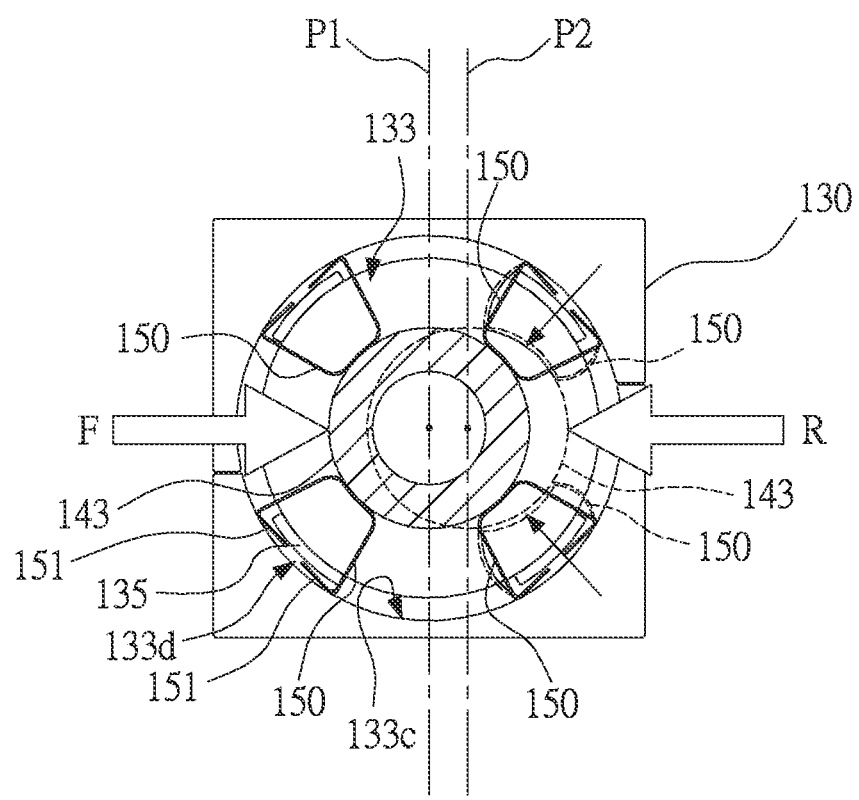
FIG. 4 is a front view of a fixed base, a connecting tube, and elastic bodies according to the first embodiment of this disclosure.
Figure 5:
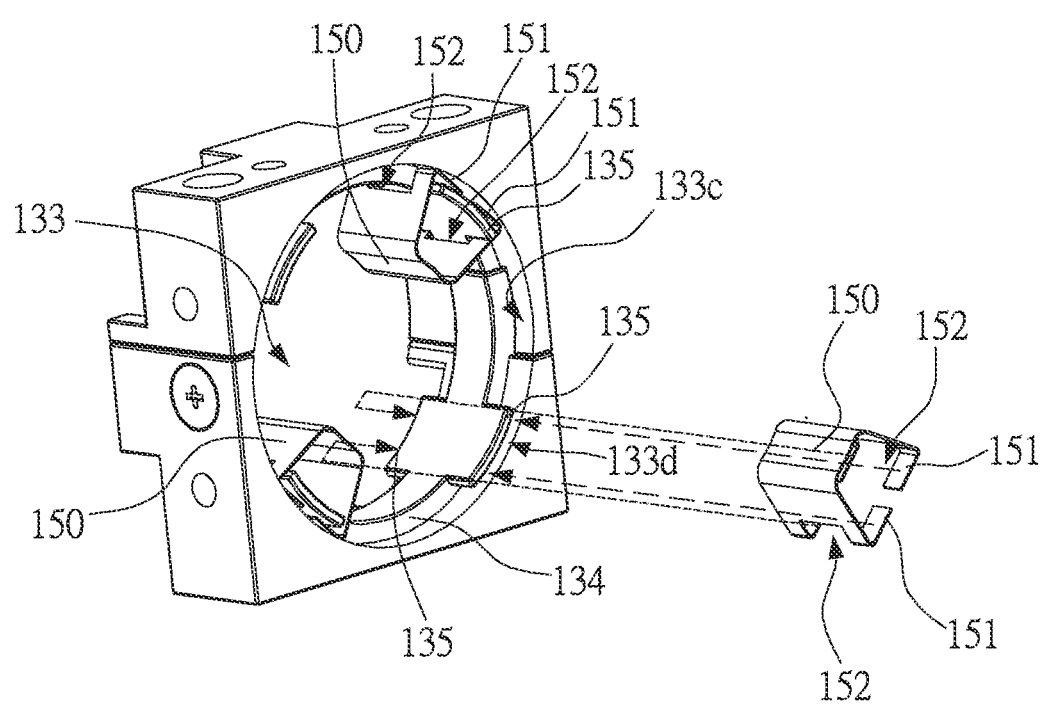
FIG. 5 is a three-dimensional diagram of the fixed base and the elastic bodies according to the first embodiment of this disclosure.

As shown in FIG. 3, FIG. 4, and FIG. 5, the accommodating bore 133 includes an inner wall surface 133c. The elastic bodies 150 are disposed on the inner wall surface 133c of the accommodating bore 133, and are arranged in radial symmetric. The elastic bodies 150 are used for coming into contact with the connecting tube 143 in various directions to normally support the connecting tube 143 at the neutral position P1, and when the connecting tube 143 is moved by a force F to a displacement position P2, some of the elastic bodies 150 are compressed to provide an elastic force R for pushing the connecting tube 143 back to the neutral position P1.

As shown in FIG. 4 and FIG. 5, in a specific embodiment, the elastic body 150 is a bent elastic sheet. The elastic sheet includes two buckle ends 151, and each of the buckle ends 151 is provided with a buckle notch 152. The fixed base 130 further includes an annular inward flange 134 and a plurality of pairs of axial protruding sheets 135. The annular inward flange 134 protrudes from the inner wall surface 133c of the accommodating bore 133, and is configured to be coaxial with the accommodating bore 133. Each pair of the axial protruding sheets 135 protrude, in opposite directions, from two side surfaces of the annular inward flange 134 that are opposite to each other, and a clamping gap 133d is formed between each of the axial protruding sheets 135 and the inner wall surface 133c of the accommodating bore 133. Each of the elastic sheets corresponds to one pair of the axial protruding sheets 135, the annular inward flange 134 is embedded into the two buckle notches 152 of the elastic sheet, and a part, corresponding to the buckle notch 152, of each of the buckle ends 151 is bent and is clamped in the clamping gap 133d, so that the bent elastic sheets are fixed to the inner wall surface 133c of the accommodating bore 133.

As shown in FIG. 1, FIG. 2, and FIG. 3, the first pipeline connecting piece 110 and the second pipeline connecting piece 120 are respectively connected to the two ends of the connecting tube 143. The first flange 141 and the second flange 142 respectively include outer side surfaces 141a, 142a away from each other. The first pipeline connecting piece 110 and the second pipeline connecting piece 120 respectively protrude from the outer side surfaces 141a, 142a of the first flange 141 and the second flange 142. The first pipeline connecting piece 110 and the second pipeline connecting piece 120 are used for connecting other pipelines such as water pipes conveying cooling water. In one specific embodiment, the first pipeline connecting piece 110 and the second pipeline connecting piece 120 are self-sealing quick pipe joints, and corresponding pipelines are also equipped with self-sealing quick pipe joints, so that the first pipeline connecting piece 110 and the second pipeline connecting piece 120 are quickly connected to other pipeline in a pluggable manner. In this disclosure, it is not excluded that the corresponding pipelines are directly connected to the two ends of the connecting tube 143. That is, configuration of the first pipeline connecting piece 110 and the second pipeline connecting piece 120 may be omitted from the fluid pipeline connection device 100, and the other pipelines are connected through the connecting tube 143.

As shown in FIG. 1, FIG. 2, and FIG. 3, the fluid pipeline connection device 100 further includes a guiding piece 160 directly or indirectly combined with the connecting tube 143. In a specific embodiment, the guiding piece 160 is disposed on the outer side surface 141a of the first flange 141, and is indirectly combined with connecting tube 143. In one specific embodiment, the guiding piece 160 is integrally formed in the first flange 141, or is a detachable component.

Figure 6:
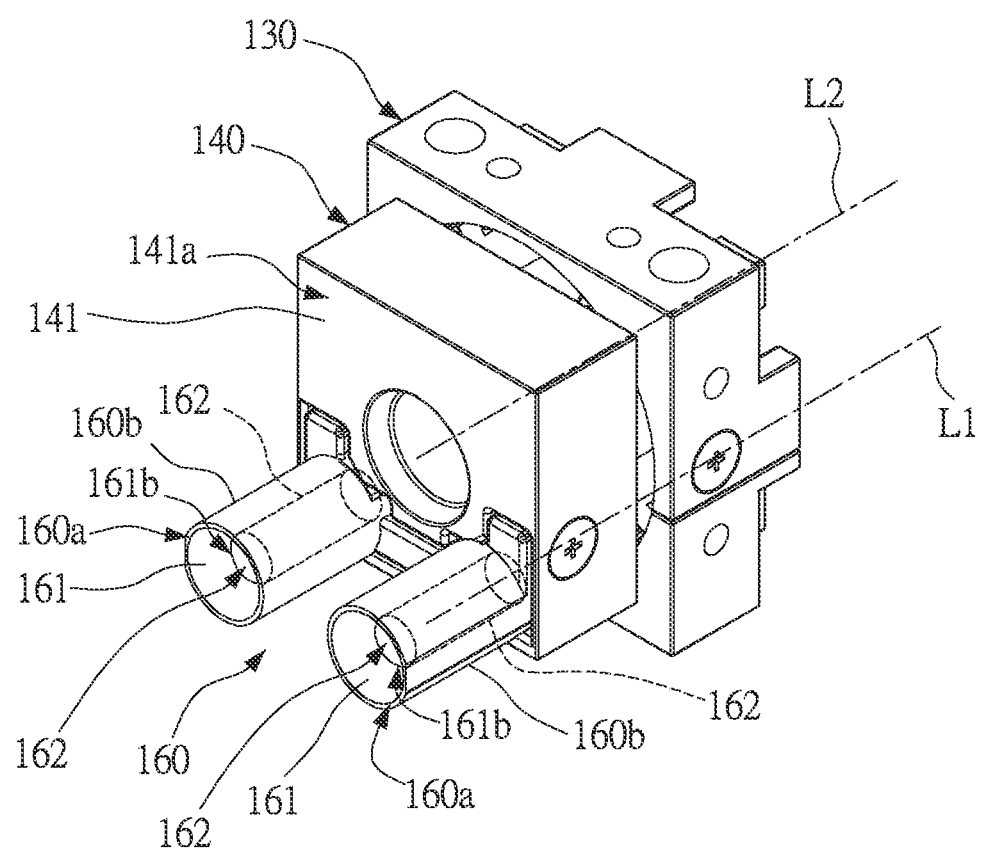
FIG. 6 is a three-dimensional diagram of the fixed base, a floating piece, and a guiding piece according to the first embodiment of this disclosure.

As shown in FIG. 6, the guiding piece 160 is provided with at least one tapered hole 161 and at least one guiding hole 162. The tapered hole 161 is provided in a surface 160a of the guiding piece 160, and a bottom 161a of the tapered hole 161 is connected to the at least one guiding hole 162. The guiding hole 162 extends into the guiding piece 160, and an axial direction L1 of the guiding holes 162 is parallel to an axial direction L2 of the connecting tube 143. Specifically, the guiding piece 160 in this embodiment is provided with two guiding blocks 160b and two tapered holes 161. The two guiding blocks 160b are disposed on the outer side surface 141a of the first flange 141. The two tapered holes 161 are respectively provided in the two guiding blocks 160b, and a bottom of each of the tapered holes 161 is connected to one guiding hole 162. That is, the guiding piece 160 is provided with the two tapered holes 161 respectively connected to the two guiding holes 162.

Figure 7:
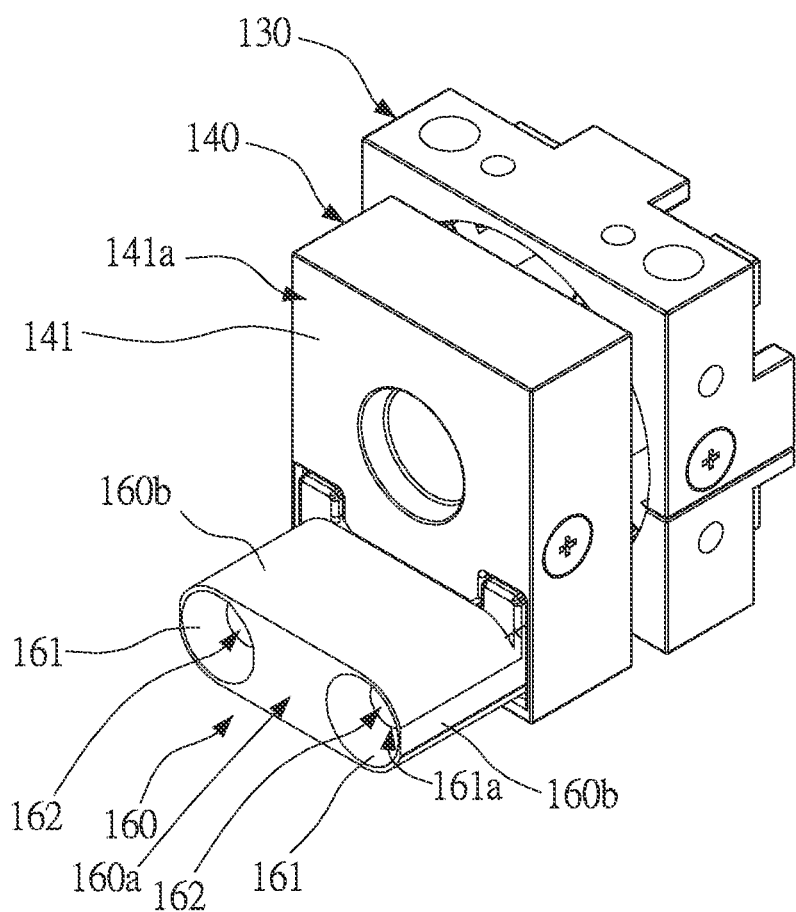
FIG. 7 and FIG. 8 are three-dimensional diagrams of variant examples of the fluid pipeline connection device according to the first embodiment of this disclosure.

As shown in FIG. 7, in a specific embodiment, the guiding piece 160 is a single block body, and the single block body is provided with two tapered holes 161 on the surface 160a of the guiding piece 160, and the bottom 161a of each of the two tapered holes 161 is connected to one guiding hole 162.

Figure 8:
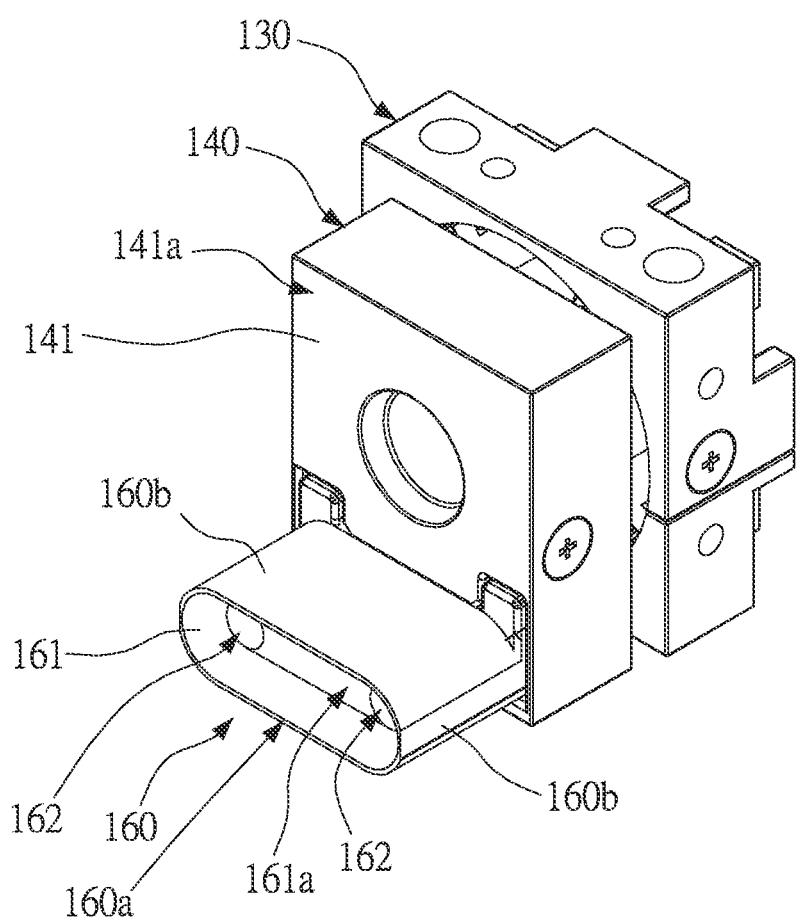

As shown in FIG. 8, in another specific embodiment, the guiding piece 160 is a single block body, and the single block body is provided with one tapered hole 161 the surface 160a of the guiding piece 160. The tapered hole 161 is in a form of an elongated slot-hole, and the bottom 161a of the tapered hole 161 is connected to the two guiding holes 162.

Figure 9:
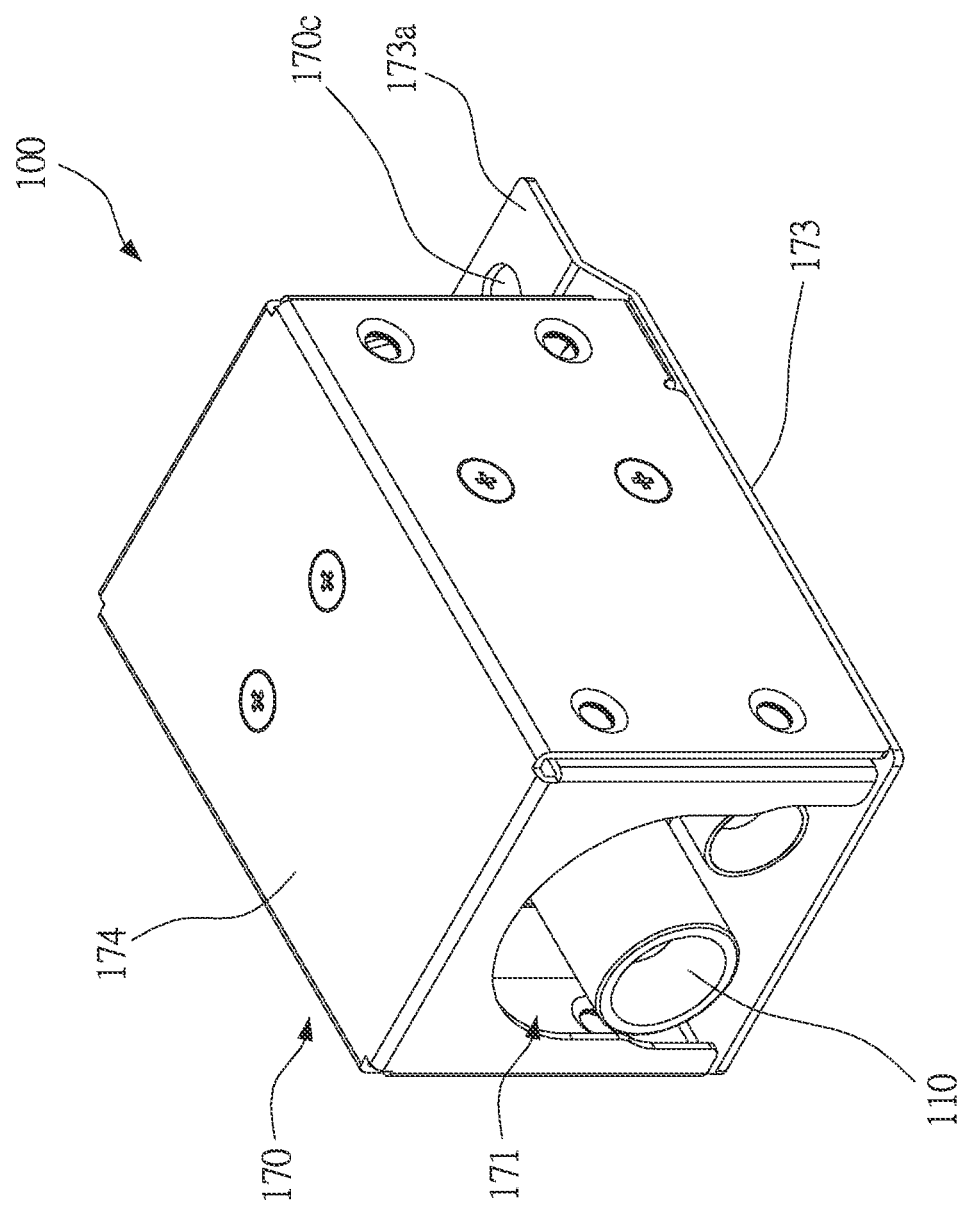
FIG. 9 is still another three-dimensional diagram of the fluid pipeline connection device according to the first embodiment of this disclosure.
Figure 10:
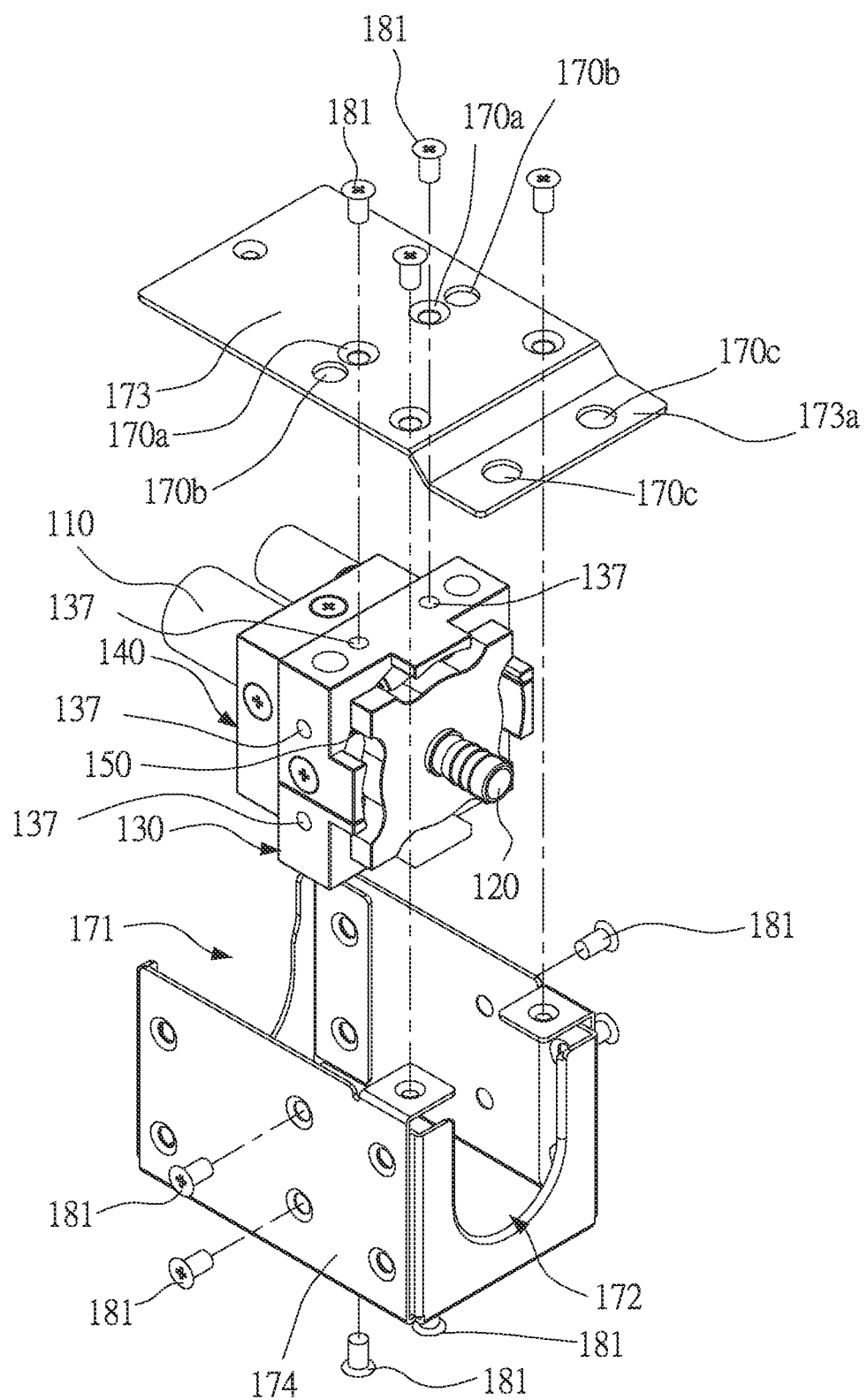
FIG. 10 is another exploded view of the fluid pipeline connection device according to the first embodiment of this disclosure.
Figure 11:
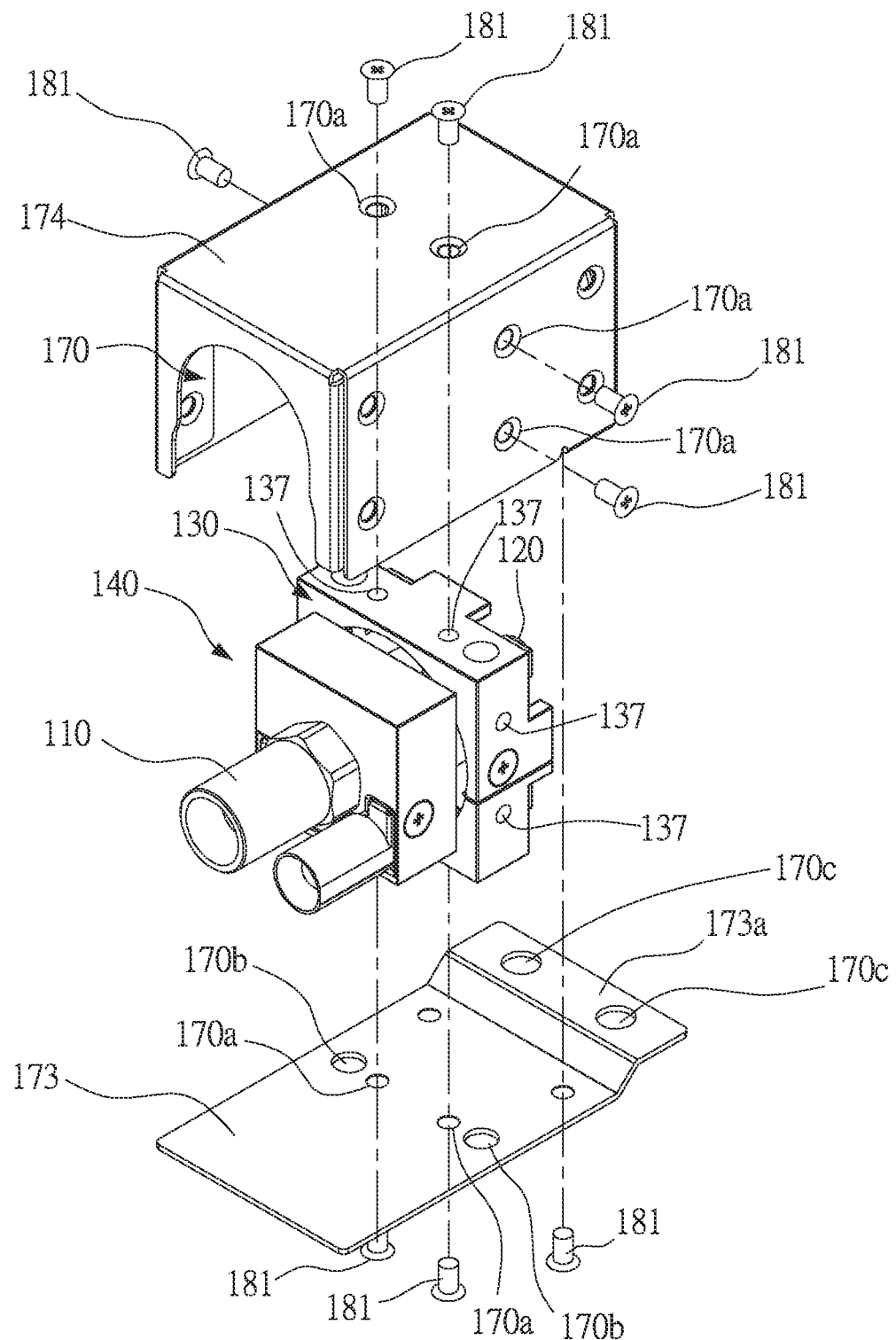
FIG. 11 is still another exploded view of the fluid pipeline connection device according to the first embodiment of this disclosure.

As shown in FIG. 9, FIG. 10, and FIG. 11, the fluid pipeline connection device 100 further includes a protection shell 170. The protection shell 170 is provided with a first opening 171 and a second opening 172 opposite to each other. The protection shell 170 is provided for accommodating the fixed base 130, the floating piece 140, and the elastic bodies 150. The fixed base 130 is fixed to the protection shell 170. The two ends of the connecting tube 143 respectively correspond to the first opening 171 and the second opening 172, so that the first pipeline connecting piece 110 and the second pipeline connecting piece 120 are exposed through the first opening 171 and the second opening 172 respectively.

As shown in FIG. 9, FIG. 10, and FIG. 11, the protection shell 170 includes a seat 173 and an upper cover 174. The upper cover 174 is configured to be combined with the seat 173 to define an inner space. The first opening 171 and the second opening 172 are provided in the upper cover 174. The upper cover 174 and the seat 173 of the protection shell 170 are respectively provided with first fixing through holes 170a, the fixed base 130 is provided with first locking holes 137 corresponding to the first fixing through holes 170a. The first fixing through hole 170a is provided for a first locking piece 181 to pass through, so that the first locking piece 181 is locked in the first locking hole 137, to enable the fixed base 130 to be fixed to the seat 173 and the upper cover 174 of the protection shell 170. The seat 173 is provided with one or more second fixing through holes 170b, the fixed base 130 is provided with positioning holes 138 corresponding to the second fixing through holes 170b, and each of the second fixing through holes 170b and one positioning hole 138 overlap with each other. In addition, the seat 173 further includes a fixing portion 173a, and the fixing portion 173a is provided with a third fixing through hole 170c. The protection shell 170 is used for modularizing the fluid pipeline connection device 100 into modules that can be independently assembled and disassembled.

Figure 12:
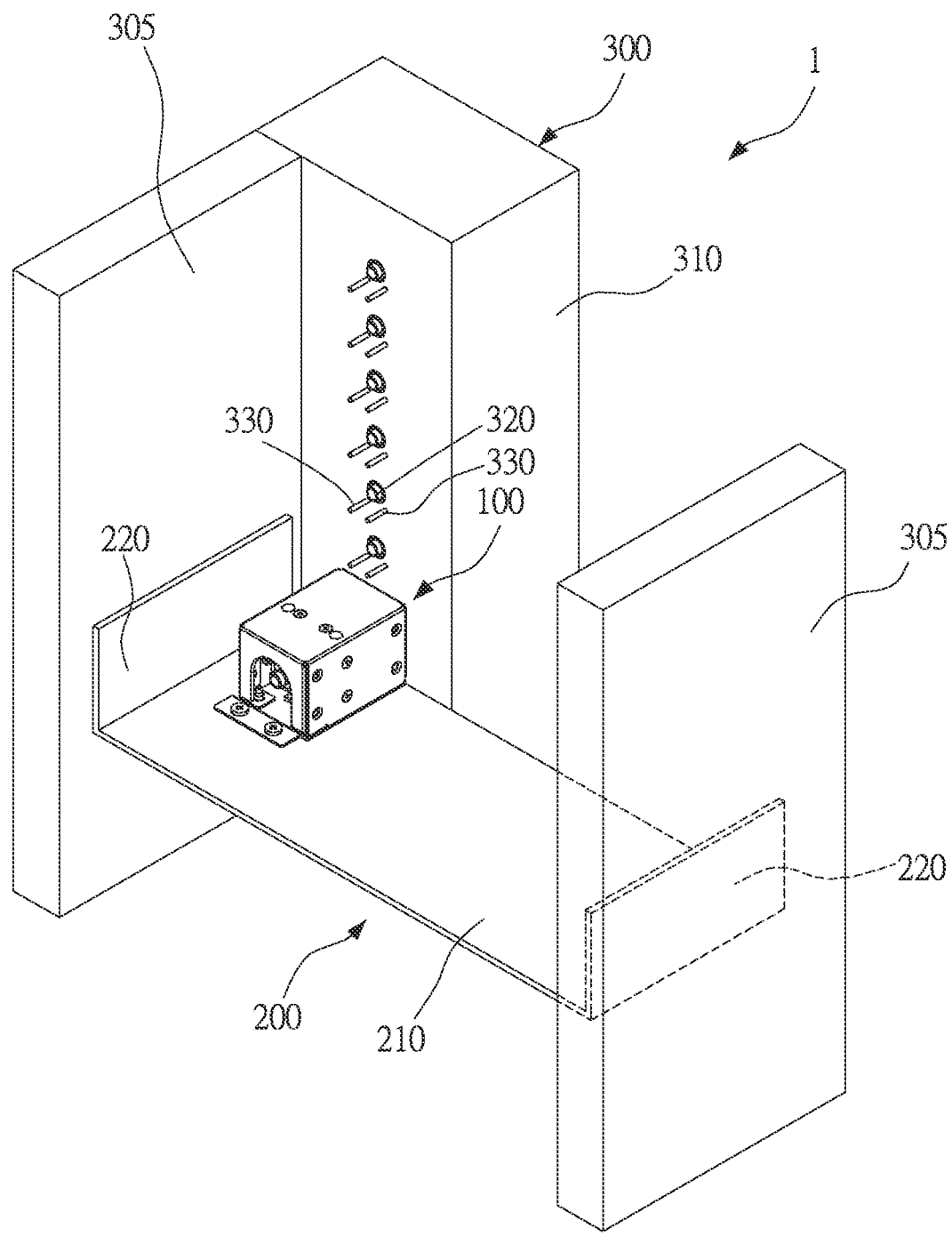
FIG. 12 is a three-dimensional diagram of a fluid pipeline connection mechanism according to the first embodiment of this disclosure.
Figure 13:
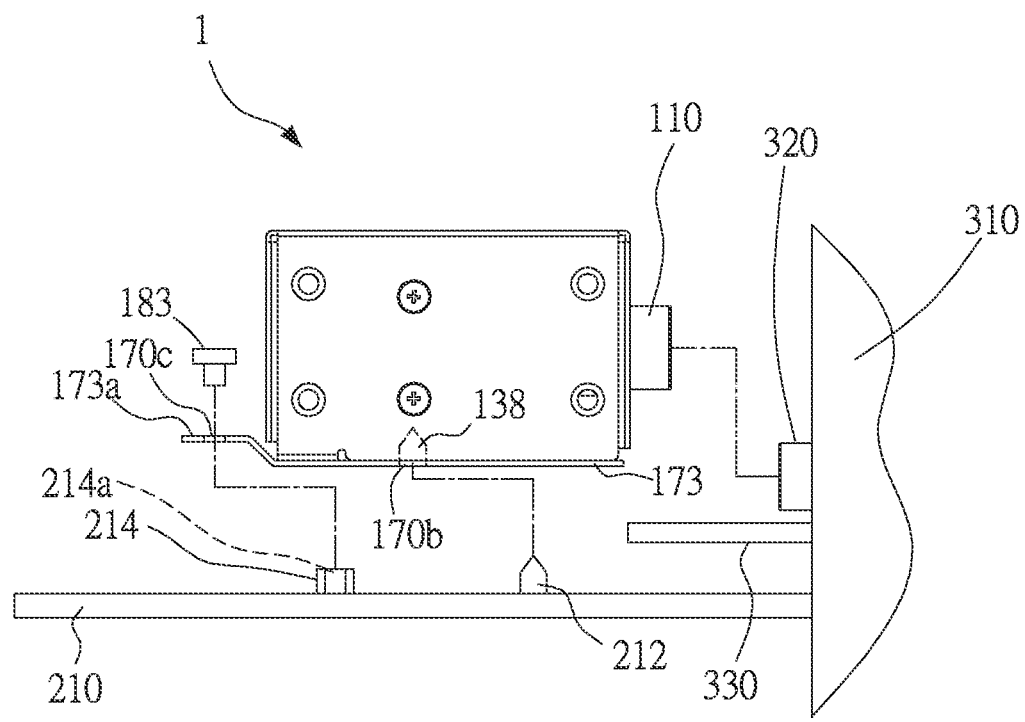
FIG. 13 is a partial side view of the fluid pipeline connection mechanism according to the first embodiment of this disclosure.
Figure 14:
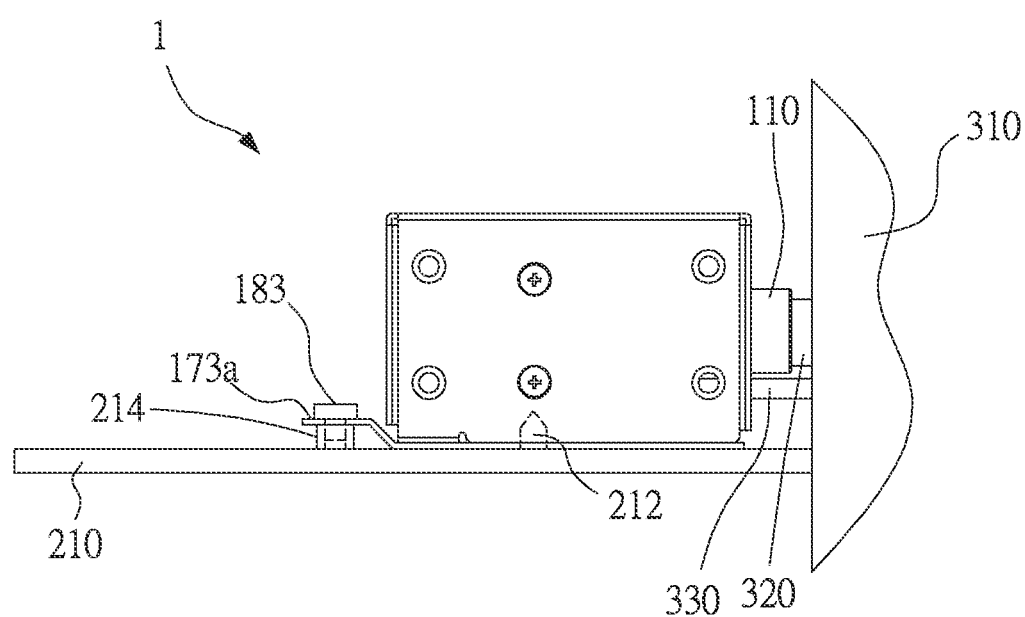
FIG. 14 is another partial side view of the fluid pipeline connection mechanism according to the first embodiment of this disclosure.

As shown in FIG. 12, FIG. 13, FIG. 14, the embodiments of this disclosure further disclose a fluid pipeline connection assembly 1 configured to connect a part of a cooling liquid circulation system to remaining parts, to form the cooling liquid circulation system. The fluid pipeline connection assembly 1 includes a rack 200 and the fluid pipeline connection device 100. The rack 200 is provided for fixing the fluid pipeline connection device 100 thereon. The rack 200 includes a bottom plate 210, two side plates 220, and components (not shown) assisting in fixing pipelines and cables. The side plates 220 perpendicularly extend on two edges of the bottom plate 210 that are opposite to each other. The fluid pipeline connection device 100 is fixed to the bottom plate 210, and the first pipeline connecting piece 110 and the guiding piece 160 correspond to a front edge of the bottom plate 210.

As shown in FIG. 13 and FIG. 14, the seat 173 is configured to be fixed to the bottom plate 210. A positioning pin 212 is disposed on the bottom plate 210. The positioning pin 212 is provided for passing through the second fixing through hole 170b and the positioning hole 138, and fixing the seat 173 and the fixed base 130 in a direction parallel to the bottom plate 210. In addition, the third fixing through hole 170c of the fixing portion 173a is used for a third locking piece 183 to pass through, so that the third locking piece 183 is locked to the bottom plate 210, to further fix the seat 173 to the bottom plate 210. In this embodiment, the fixing portion 173a is a bent part of an edge of the seat 173, so that when the seat 173 is in contact with the bottom plate 210, the fixing portion 173a and the bottom plate 210 are kept at a spacing distance. A locking base 214 is disposed on the bottom plate 210, and the locking base 214 is provided with a third locking hole 214a configured to lock the third locking piece 183 after the third locking piece 183 passes through the third fixing through hole 170c, to be locked to the bottom plate 210.

As shown in FIG. 12, FIG. 13, and FIG. 14, the embodiments of this disclosure further disclose a fluid pipeline connection mechanism configured for connecting different parts of a cooling liquid circulation system. As described above, the cooling liquid circulation system includes a cooling liquid reservoir, a liquid pump, a heat dissipation device, a water cooled heat sink, and pipelines. The foregoing components are disposed in different regions. For example, the water cooled heat sink is disposed in a computer case 300 and is used for coming into contact with a heat source in the computer case 300, for example, a central processing unit. The other portions of the cooling liquid circulation system are disposed outside the computer case 300 through connection of the fluid pipeline connection assembly 1.

As shown in FIG. 12, FIGS. 13, and 14, the fluid pipeline connection mechanism includes the fluid pipeline connection assembly 1 and the computer case 300. The computer case 300 includes two side frames 305 and a pipeline bracket 310. A receiving unit is disposed on the pipeline bracket 310. A plurality of receiving units at different heights may be disposed on the pipeline bracket 310, and connected to different heat sources through the cooling liquid circulation system. Each of the receiving units includes a receiving tube 320 and two guiding columns 330. The receiving tube 320 and the guiding column 330 are configured in parallel to each other. The receiving tube 320 may be a self-sealing quick pipe joint, and the receiving tube 320 and the first pipeline connecting piece 110 are male and female joints disposed in a matching manner. However, it is not executed that the receiving tube 320 and the first pipeline connecting piece 110 are male and female joints in another form. The two side plates 220 of the rack 200 are configured to be combined with the two side frames 305, to enable the front edge to correspond to the pipeline bracket 310.

As shown in FIG. 12, FIG. 13, and FIG. 14, the receiving tube 320 and the guiding column 330 protrude out of the pipeline bracket 310, and the guiding column 330 is parallel to the receiving tube 320. A relative position relationship between the guiding column 330 and the receiving tube 320 matches a relative position relationship between the guiding hole 162 and the connecting tube 143.

As shown in FIG. 15, FIG. 16, FIG. 17, and FIG. 18, the guiding column 330 is configured to be inserted into the guiding hole 162 to drive the floating piece 140 to move in a radial direction, and rotate relative to the guiding column 330, so that the connecting tube 143 is able to be aligned with the receiving tube 320, and the first pipeline connecting piece 110 is able to be blindly connected to the receiving tube 320.

Figure 15:
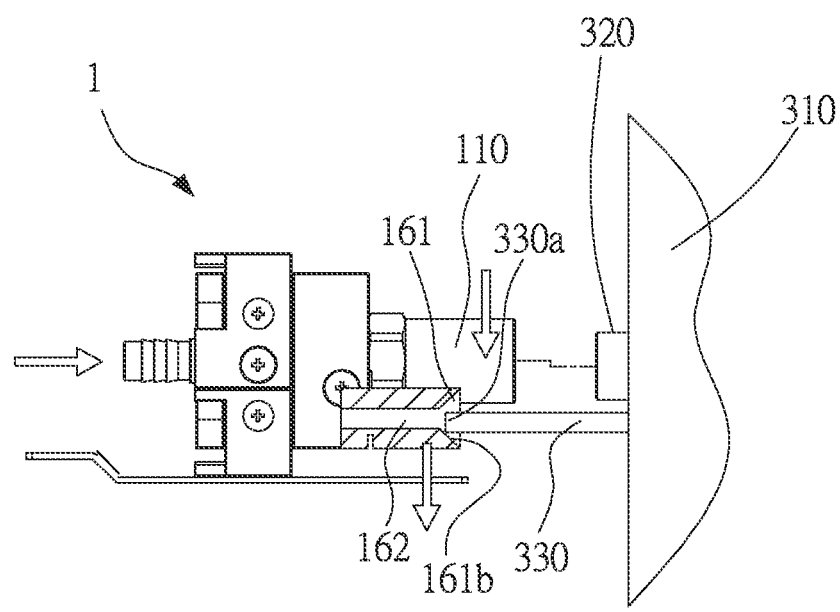
FIG. 15 is a partial side view, disclosing a linkage between a guiding piece and a guiding column, of the fluid pipeline connection mechanism according to the first embodiment of this disclosure.
Figure 16:
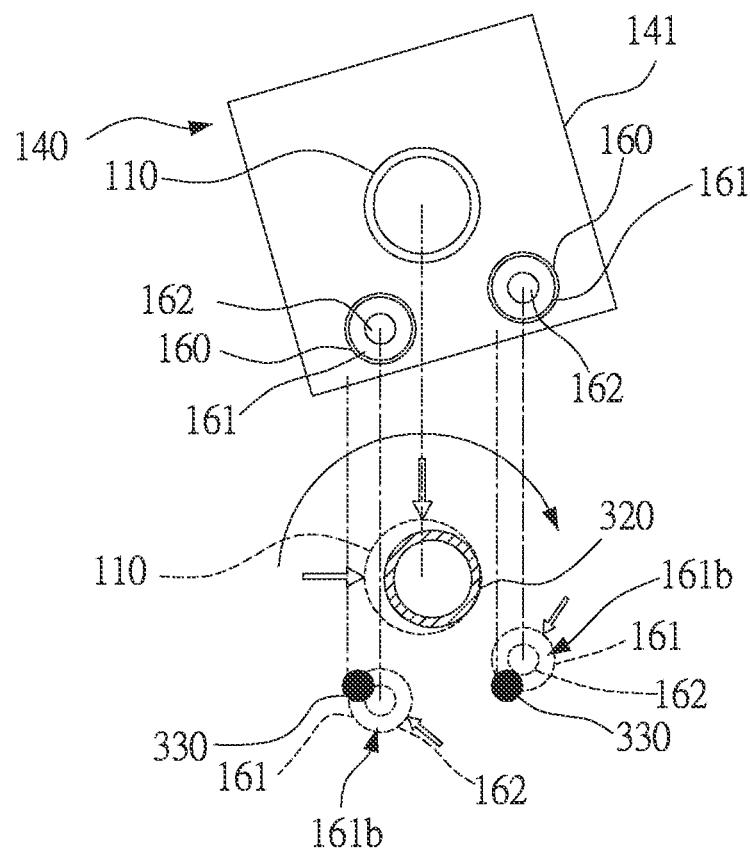
FIG. 16 is a front view, disclosing a linkage between a guiding piece and a guiding column, of a floating piece according to the first embodiment of this disclosure.

As shown in FIG. 15 and FIG. 16, specifically, when the fluid pipeline connection assembly 1 moves towards the pipeline bracket 310, a front end 330a of the guiding column 330 first comes into contact with a wall surface 161b of the tapered hole 161 to drive the floating piece 140 to move in the radial direction, so that the guiding hole 162 is gradually aligned with the front end 330a of the guiding column 330.

Figure 17:
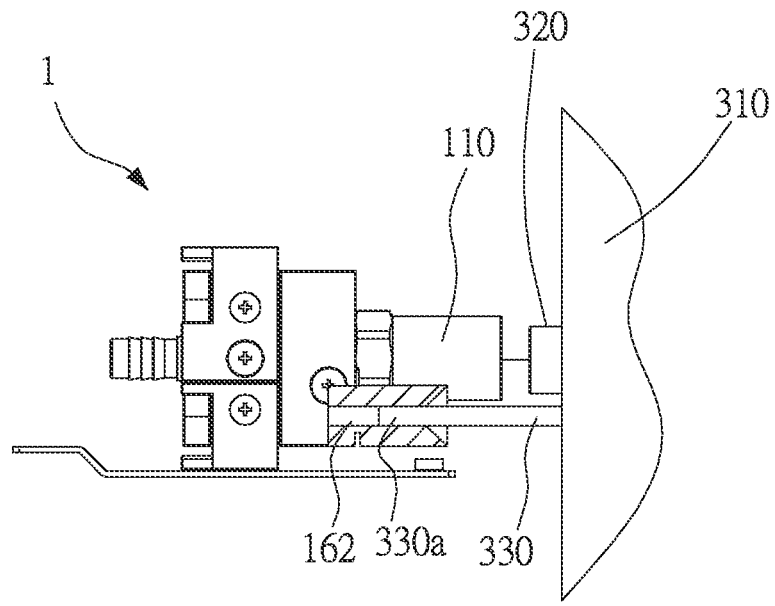
FIG. 17 is another partial side view, disclosing the linkage between the guiding piece and the guiding column, of the fluid pipeline connection mechanism according to the first embodiment of this disclosure.
Figure 18:
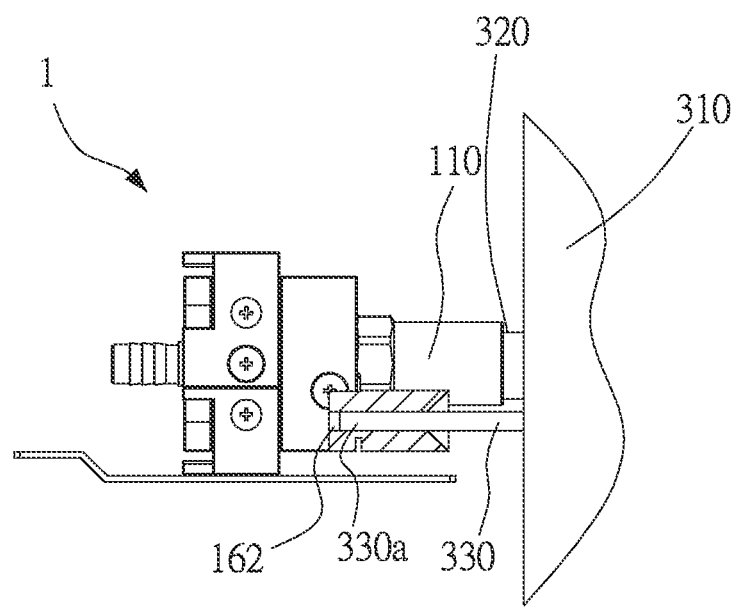
FIG. 18 is still another partial side view, disclosing the linkage between the guiding piece and the guiding column, of the fluid pipeline connection mechanism according to the first embodiment of this disclosure.

As shown in FIG. 17 and FIG. 18, the fluid pipeline connection assembly 1 continuously moves toward the pipeline bracket 310, and the front end 330a of the guiding column 330 enters the guiding hole 162. When both of the two guiding columns 330 enter the wall surface of the tapered hole 161 with which the two guiding columns 330 are in contact, the floating piece 140 not only moves along the radial direction, but also rotates in the axial direction, so that the connecting tube 143 can be aligned with the receiving tube 320 to be blindly connected to the receiving tube 320 directly or through the first pipeline connecting piece 110, as shown in FIG. 14.

As shown in FIG. 12, because the side plates 220 of the fluid pipeline connection assembly 1 are combined with the side frames 305 of the computer case 300, the bottom plate 210 of the rack 200 applies a tightening force in a direction toward the receiving tube 320 to the connecting tube 143 through the fixed base 130 and the first flange 141, and the pipeline bracket 310 of the computer case 300 also applies a tightening force in a direction toward the connecting tube 143 to the receiving tube 320, so that the connecting tube 143 and the receiving tube 320 may be tightly connected regardless of whether the first pipeline connecting piece 110 is disposed therebetween. Therefore, the connecting tube 143 and the receiving tube 320 can effectively resist pressure of a cooling liquid, to avoid falling off or a leakage.

Figure 19:
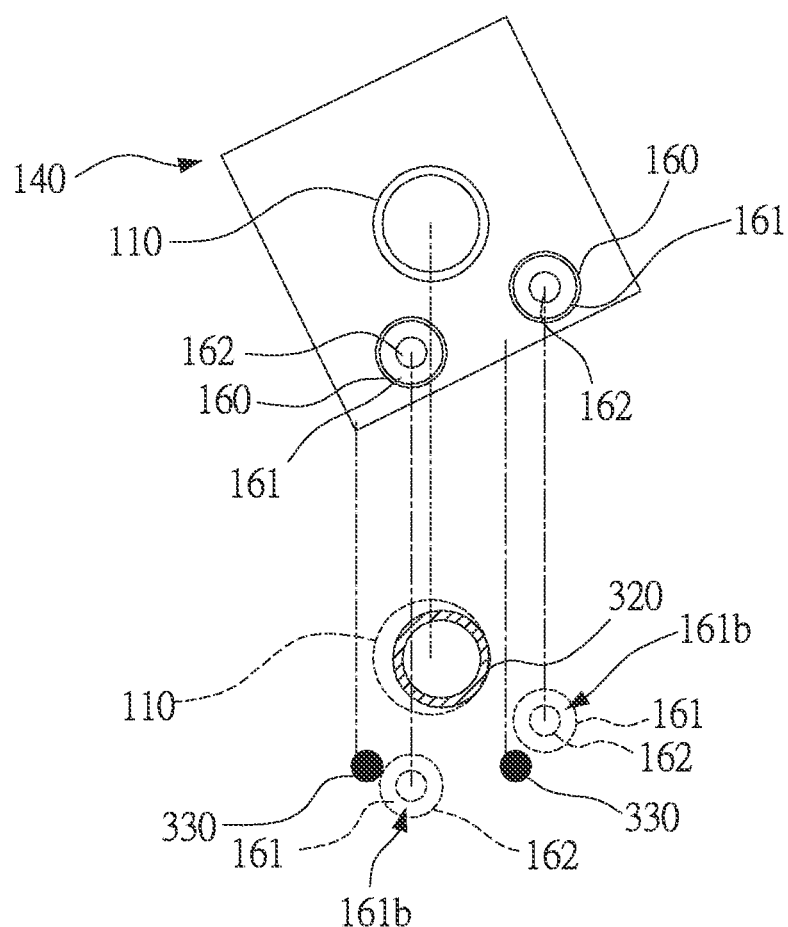
FIG. 19 is a front view, disclosing a matching relationship between a tapered hole and a guiding column when a floating piece rotates in an axial direction at a large rotating angle, of the floating piece according to the first embodiment of this disclosure.

As shown in FIG. 19, the floating piece 140 is able to rotate freely along the axial direction in the fixed base 130. When a rotating angle is large, the tapered hole 161 and the guiding hole 162 are also displaced greatly. If the tapered hole 161 and the guiding hole 162 are displaced greatly, the front end 330a of the guiding column 330 totally cannot come into contact with the wall surface 161b of the tapered hole 161 and enter the guiding hole 162. Therefore, the rotation of the floating piece 140 in the axial direction needs to be limited.

Figure 20:
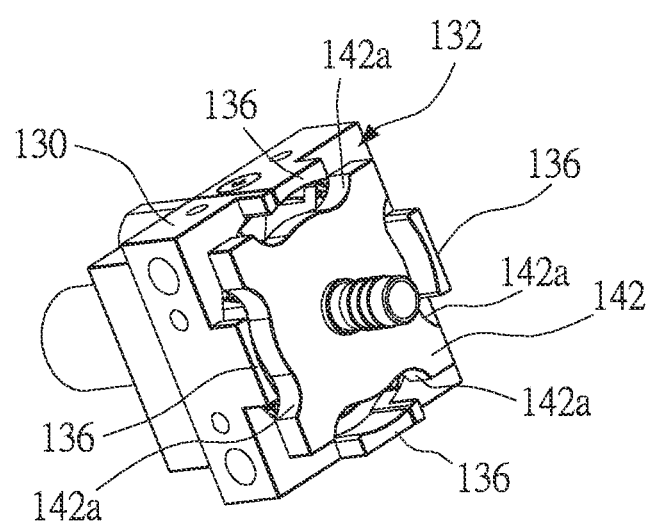
FIG. 20 is still another three-dimensional diagram of the fluid pipeline connection device according to the first embodiment of this disclosure.

As shown in FIG. 20, the second flange 142 is provided with four limiting notches 142a. The fixed base 130 includes four limiting bumps 136. The four limiting bumps 136 are disposed on the second side surface 132 of the fixed base 130, and each of the limiting bumps 136 is located in one limiting notch 142a to limit an angle at which the floating piece 140 rotates along the axial direction. That the four limiting notches 142a match the four limiting bumps 136 is merely an example. Quantities of the limiting notches 142a and the limiting bumps 136 may be arbitrarily configured. For example, the second flange 142 is provided with one limiting notch 142a, and the fixed base 130 includes one limiting bump 136. The configuration of the limiting notch 142a and the limiting bump 136 may alternatively be that the first flange 141 is provided with the limiting notch 142a, and the limiting bump 136 is disposed on the first side surface 131 of the fixed base 130. Specifically, when the floating piece 140 reaches a maximum rotating angle, it is still needed that the front end of the guiding column 330 can come into contact with the wall surface of the tapered hole 161. Sizes of the limiting notch 142a and the limiting bump 136 are used for limiting the maximum rotating angle.

Figure 21:
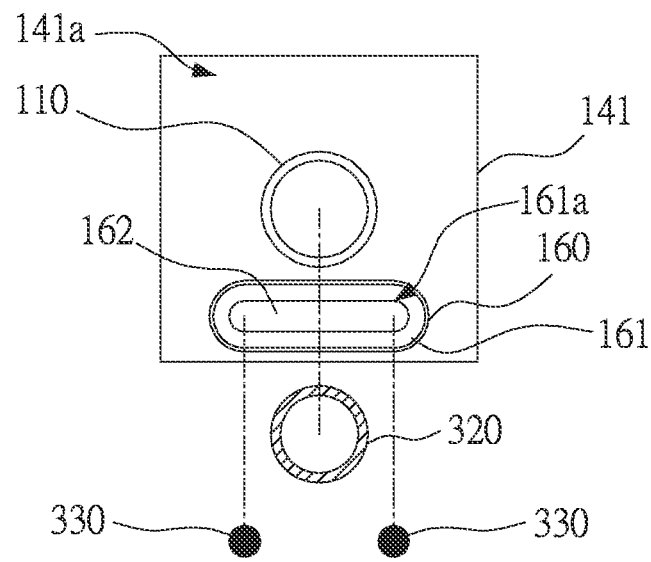
FIG. 21 is a front view, disclosing a matching relationship between a guiding piece and a guiding column, of a floating piece according to a second embodiment of this disclosure.

As shown in FIG. 21, in a second embodiment, the guiding piece 160 may be a single block body, and the single block body is provided with a single tapered hole 161 and a single guiding hole 162. The bottom 161a of the tapered hole 161 is connected to the guiding hole 162, and the guiding hole 162 is an elongated slot-hole. In this case, the two guiding columns 330 are configured to correspond to two ends of the elongated slot-hole, so that the floating piece 140 may be driven to rotate relative to the two guiding columns 330 to align the connecting tube 143 with the receiving tube 320.

Figure 22:
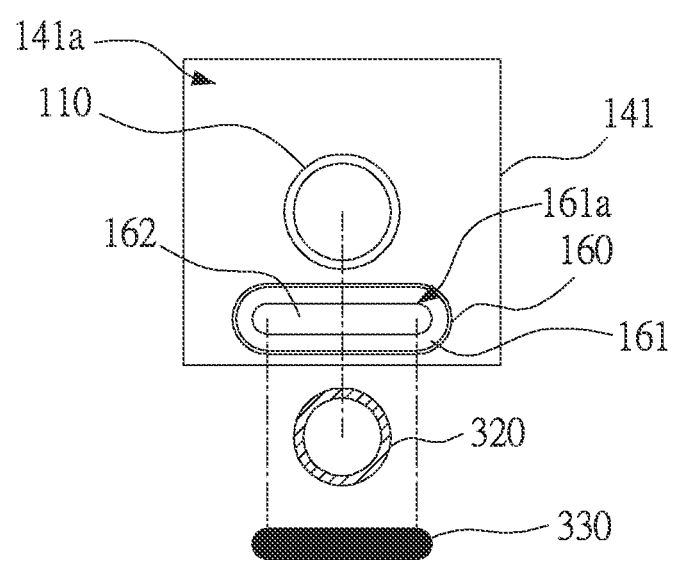
FIG. 22 is a front view, disclosing a matching relationship between a guiding piece and a guiding column, of a floating piece according to the second embodiment of this disclosure.

As shown in FIG. 22, in a third embodiment, the guiding piece 160 may be a single block body, and the single block body is provided with a single tapered hole 161 and a single guiding hole 162. The bottom 161a of the tapered hole 161 is connected to the guiding hole 162, and the guiding hole 162 is in a non-circular hole form, for example, in a form of an elongated slot-hole. The computer case 300 may be equipped with a single guiding column 330, the guiding column 330 is in a non-cylindrical form, and matches the form of the guiding hole 162. In this case, the guiding column 330 in the non-cylindrical form is inserted into the guiding hole 162 in the non-circular hole form, so that the floating piece 140 can be driven to rotate relative to the guiding column 330 to align the first pipeline connecting piece 110 with the receiving tube 320.

In this disclosure, configuration of the floating piece 140 enables displacement of the connecting tube 143 within a range to align the connecting tube 143 with the corresponding receiving tube 320, so as to connect the connecting tube 143 to the corresponding receiving tube 320. In a process of jointing the connecting tube 143 with the receiving tube 320 by matching the guiding piece 160 and the guiding column 330, the guiding piece 160 and the guiding column 330 drives the connecting tube 143 to align the connecting tube 143 with the receiving tube 320, so that the connecting tube 143 is not required to align the receiving tube 320 in advance.

What is claimed is:

1. A fluid pipeline connection device, comprising:
   a fixed base, comprising a first side surface and a second side surface opposite to each other;
   a floating piece, abutting against the first side surface and the second side surface;
   a connecting tube, passing through the first side surface and the second side surface of the fixed base, wherein the connecting tube is combined with the floating piece; and
   a plurality of elastic bodies, disposed in the fixed base, wherein the plurality of elastic bodies are in contact with the connecting tube.

2. The fluid pipeline connection device according to claim 1, wherein the floating piece comprises a first flange and a second flange abutting against the first side surface and the second side surface respectively, and the connecting tube is connected to the first flange and the second flange.

3. The fluid pipeline connection device according to claim 2, wherein the fixed base has an accommodating bore, the connecting tube is located in the accommodating bore, and projection areas of the first flange and the second flange along an axial direction of the accommodating bore are respectively greater than a cross-sectional area of the accommodating bore.

4. The fluid pipeline connection device according to claim 2, wherein one of the first flange and the second flange has at least one limiting notch, the fixed base has at least one limiting bump, and the at least one limiting bump is located in the at least one limiting notch.

5. The fluid pipeline connection device according to claim 2, further comprising a first pipeline connecting piece and a second pipeline connecting piece connected to two ends of the connecting tube respectively, wherein the first flange and the second flange respectively comprise outer side surfaces away from each other, and the first pipeline connecting piece and the second pipeline connecting piece respectively protrude from the outer side surfaces.

6. The fluid pipeline connection device according to claim 1, further comprising a protection shell provided with a first opening and a second opening opposite to each other, wherein the protection shell is configured to accommodate the fixed base, the floating piece, the connecting tube, and the plurality of elastic bodies, the fixed base is fixed to the protection shell, and two ends of the connecting tube respectively correspond to the first opening and the second opening.

7. The fluid pipeline connection device according to claim 6, wherein the protection shell comprises a seat and an upper cover, the upper cover is combined with the seat, and the first opening and the second opening are provided in the upper cover.

8. The fluid pipeline connection device according to claim 7, wherein the upper cover and the seat are each provided with at least one first fixing through hole, the fixed base is provided with a plurality of first locking holes corresponding to the first fixing through holes, and each of the first fixing through holes is configured for a first locking piece to pass through, so that the first locking piece is locked in the corresponding first locking hole.

9. The fluid pipeline connection device according to claim 1, wherein the fixed base is further provided with an accommodating bore communicating with the first side surface and the second side surface, and the connecting tube passes through the accommodating bore.

10. The fluid pipeline connection device according to claim 9, wherein the fixed base comprises a plurality of cutting blocks, each of the cutting blocks is provided with a notch, and the cutting blocks are configured to combine with each other to combine the notches into the accommodating bore.

11. The fluid pipeline connection device according to claim 10, wherein
- each of the elastic bodies is a bent elastic sheet, each of the elastic sheets comprises two buckle ends, and each of the buckle ends is provided with a buckle notch;
- the fixed base further comprises an annular inward flange and a plurality of pairs of axial protruding sheets; the accommodating bore comprises an inner wall surface, and the annular inward flange protrudes from the inner wall surface of the accommodating bore;
- each pair of the axial protruding sheets protrude, in opposite directions, from two side surfaces of the annular inward flange that are opposite to each other, and a clamping gap is formed between each of the axial protruding sheets and the inner wall surface; and
- each of the elastic sheets corresponds to one pair of the axial protruding sheets, the annular inward flange is embedded into the two buckle notches of the elastic sheet, and a part, corresponding to each of the buckle notches, of each of the buckle ends is bent and is clamped in the clamping gap.

12. The fluid pipeline connection device according to claim 1, further comprising a guiding piece combined with the connecting tube, wherein the guiding piece is provided with at least one tapered hole and at least one guiding hole, the at least one tapered hole is provided in a surface of the guiding piece, a bottom of the at least one tapered hole is connected to the at least one guiding hole, the at least one guiding hole extends into the guiding piece, and an axial direction of the at least one guiding holes is parallel to an axial direction of the connecting tube.

13. The fluid pipeline connection device according to claim 12, wherein the guiding piece is provided with two tapered holes and two guiding holes, and bottoms of the tapered holes are respectively connected to each of the guiding holes.

14. The fluid pipeline connection device according to claim 13, wherein the guiding piece comprises two guiding blocks combined with the connecting tube, and the two tapered holes and the two guiding holes are respectively provided in the two guiding blocks.

15. The fluid pipeline connection device according to claim 12, wherein the guiding piece is provided with one tapered hole and at least two guiding holes, the tapered hole is in a form of an elongated slot-hole, and a bottom of the tapered hole is connected to the at least two guiding holes.

16. A fluid pipeline connection assembly, comprising:
- a bottom plate; and
- the fluid pipeline connection device according to claim 7, fixed to the bottom plate;
- wherein the seat is provided with at least one second fixing through hole, the fixed base is provided with at least one positioning hole, and the second fixing through hole and the positioning hole overlap with each other; and a positioning pin is disposed on the bottom plate, and the positioning pin is configured to pass through the at least one second fixing through hole and the at least one positioning hole.

17. The fluid pipeline connection assembly according to claim 16, wherein the seat comprises a fixing portion, the fixing portion is provided with at least one third fixing through hole, a third locking piece is disposed on the bottom plate, passes through the at least one third fixing through hole, and is locked to the bottom plate.

18. The fluid pipeline connection assembly according to claim 17, wherein the fixing portion is a bent part of an edge of the seat, and when the seat is in contact with the bottom plate, the fixing portion and the bottom plate are kept at a spacing distance; and a locking base is disposed on the bottom plate, the locking base is provided with one third locking hole configured for the third locking piece passes through the third fixing through hole to be locked.

19. A fluid pipeline connection mechanism, comprising:
- a bottom plate;
- the fluid pipeline connection device according to claim 12, fixed to the bottom plate; and
- a pipeline bracket, wherein a receiving tube and at least one guiding column are disposed on the pipeline bracket, and the at least one guiding column is parallel to the receiving tube;
- wherein the fluid pipeline connection device further comprises a guiding piece, the guiding piece is combined with the connecting tube, the guiding piece is provided with at least one tapered hole and at least one guiding hole, the at least one tapered hole is provided in a surface of the guiding piece, and a bottom of the at least one tapered hole is connected to the at least one guiding hole; and the guiding column is configured to be inserted into the at least one guiding hole to drive the floating piece to move and align the connecting tube with the receiving tube.

20. The fluid pipeline connection mechanism according to claim 19, wherein the guiding piece is provided with two guiding holes, and two guiding columns are disposed on the pipeline bracket.

21. The fluid pipeline connection mechanism according to claim 19, wherein the at least one guiding hole is an elongated slot-hole, two guiding columns are disposed on the pipeline bracket, and the two guiding columns are configured to correspond to two ends of the elongated slot-hole.

22. The fluid pipeline connection mechanism according to claim 19, wherein the at least one guiding hole is in a non-circular hole form, and the at least one guiding column is in a non-cylindrical form, and matches the guiding hole.

* * * * *